(12) United States Patent
Zhou et al.

(10) Patent No.: US 11,750,081 B2
(45) Date of Patent: Sep. 5, 2023

(54) CONTROL APPARATUS FOR ADJUSTING THERMAL STRESS

(71) Applicant: DELTA ELECTRONICS, INC., Neihu (TW)

(72) Inventors: Yan Zhou, Canton, MI (US); Baiming Shao, Novi, MI (US); Yingying Gui, Novi, MI (US); Krzysztof S. Klesyk, Novi, MI (US)

(73) Assignee: DELTA ELECTRONICS, INC., Neihu (TW)

( * ) Notice: Subject to any disclaimer, the term of this patent is extended or adjusted under 35 U.S.C. 154(b) by 270 days.

(21) Appl. No.: 16/950,760

(22) Filed: Nov. 17, 2020

(65) Prior Publication Data

US 2022/0158541 A1 May 19, 2022

(51) Int. Cl.
*H02M 1/32* (2007.01)
*H02M 7/797* (2006.01)
*H02M 7/5395* (2006.01)

(52) U.S. Cl.
CPC ........... *H02M 1/32* (2013.01); *H02M 7/5395* (2013.01); *H02M 7/797* (2013.01); *H02M 1/327* (2021.05)

(58) Field of Classification Search
CPC ...... H02M 1/32; H02M 1/327; H02M 7/5395; H02M 7/797
See application file for complete search history.

(56) References Cited

U.S. PATENT DOCUMENTS

| | | | |
|---|---|---|---|
| 6,825,624 B2 | 11/2004 | Anwar et al. | |
| 8,201,897 B2 | 6/2012 | Bell et al. | |
| 9,236,828 B1 | 1/2016 | Wei et al. | |
| 9,318,976 B1 | 4/2016 | Wei et al. | |
| 2008/0297100 A1* | 12/2008 | Hiti | H02M 7/53875 363/40 |
| 2015/0188530 A1* | 7/2015 | Shinohara | H02M 7/53875 327/172 |

OTHER PUBLICATIONS

Hiti, Silva , et al., "Zero vector modulation method for voltage source inverter operating near zero output frequency", Conference Record of the 2004 IEEE Industry Applications Conference, 2004. 39th IAS Annual Meeting., Seattle, WA, USA, 2004, pp. 171-176.

* cited by examiner

*Primary Examiner* — Jue Zhang
(74) *Attorney, Agent, or Firm* — Edward C. Kwok; VLP Law Group LLP (57) ABSTRACT

A method for balancing thermal stresses in semiconductor switching devices may include (a) monitoring temperatures of the semiconductor switching devices to provide a temperature difference between two of the switching devices; and (b) based on the temperature difference, providing a zero-sequence component to be used for adjusting conduction times of each of the semiconductor devices.

14 Claims, 7 Drawing Sheets

CONTROL APPARATUS FOR ADJUSTING THERMAL STRESS

BACKGROUND OF THE INVENTION

1. Field of the Invention

The present invention relates to managing thermal stress in multi-phase voltage source inverter circuits. In particular, the present invention relates to reducing unbalanced stresses in switches of multi-phase voltage source inverter circuits.

2. Discussion of the Related Art

Figure 1:
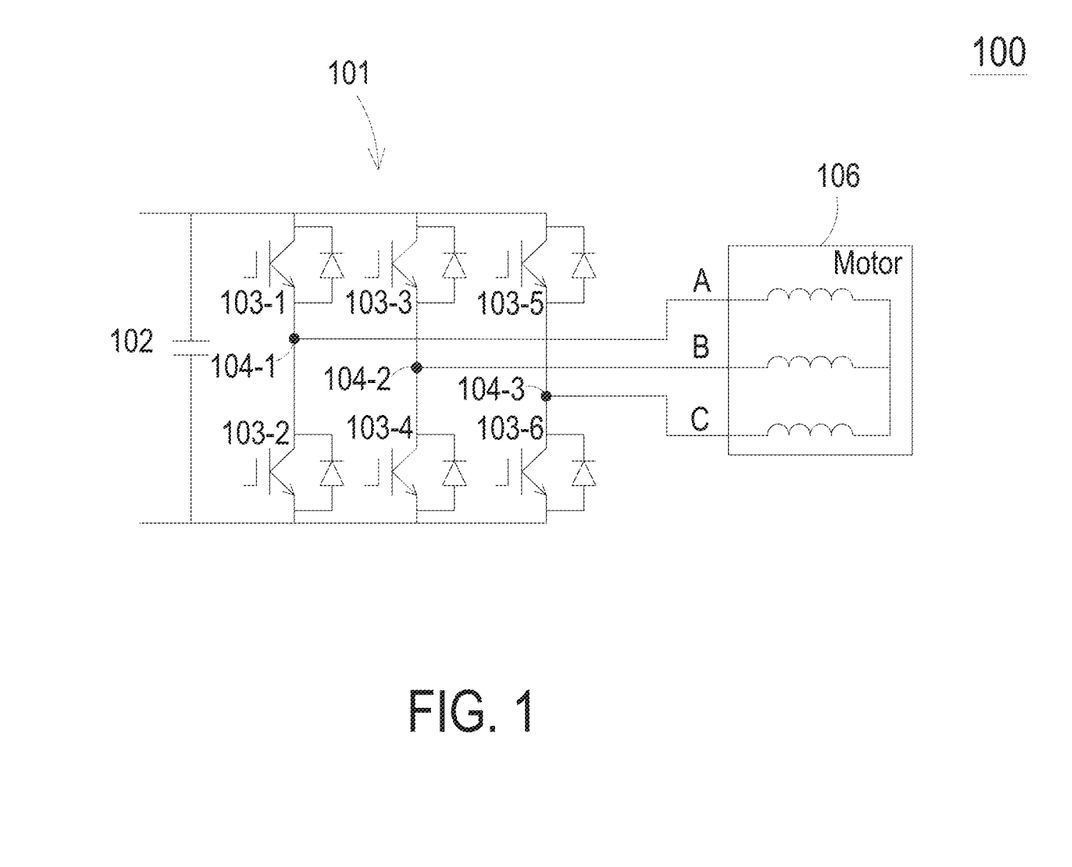
FIG. 1 is a schematic diagram of three-phase voltage source inverter 100 driving electric motor 106; three-phase voltage source inverter 100 may be used as a traction inverter.

In an electric or a hybrid-electric vehicle, an electric motor drives the wheels. When the vehicle is stopped in an up-hill position, the electric motor maintains the vehicle in a stationary state ("hill-hold operation") by providing a torque at zero or near-zero output frequency. Typically, a traction inverter drives the electric motor. FIG. 1 is a schematic diagram of three-phase voltage source inverter 100 driving electric motor 106; three-phase voltage source inverter 100 may be used as a traction inverter.

As shown in FIG. 1, power module or stage 101 of three-phase voltage source inverter 100 includes DC-link capacitor 102—serving as a voltage source—and switches 103-1 to 103-6. Each of switches 103-1 to 103-6 may include an insulated-gate bipolar transistor (IGBT), together with a diode connected in an anti-polar fashion across the IGBT's collector and emitter. Alternatively, each of switches 103-1 to 103-6 may be implemented by other suitable semiconductor devices, e.g., metal-oxide-semiconductor field-effect transistors (MOSFETs). Terminal 104-1 (i.e., the common node between switches 103-1 and 103-2), terminal 104-2 (i.e., the common node between switches 103-3 and 103-4), and terminal 104-3 (i.e., the common node between switches 103-5 and 103-6) provide output phase currents, which are labeled herein, respectively, as phases A, B and C. To facilitate the detailed description below, switches 103-1, 103-3 and 103-5 are referred to as the "upper switches" and, likewise, switches 103-2, 103-4 and 103-6 are referred to as the "lower switches."

During the hill-hold operation, the zero or near-zero frequency phase output current (e.g., a DC current or a low-frequency AC current) increases stress to three-phase voltage source inverter 100. Typically, the period of each phase output current is longer than the thermal time constant of power module 101 of three-phase voltage source inverter 100. Some examples of modulation schemes that may be used in three-phase voltage source inverter 100 to carry out a hill-hold operation include space vector pulse-width modulation (SVPWM) and discontinuous pulse-width modulation (DPWM). In either of these modulation schemes, switches 103-1 to 103-6 experience unbalanced thermal stresses.

Figure 2:
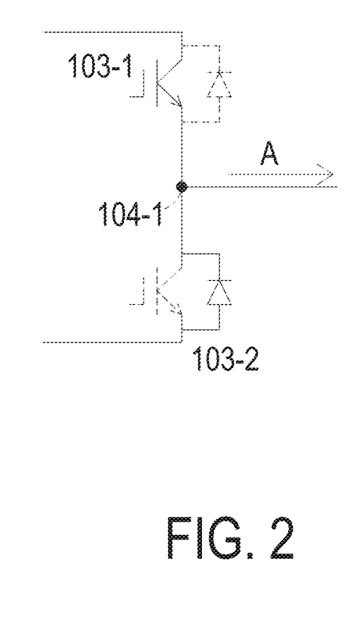
FIG. 2 illustrates providing a positive output phase current from terminal 104-1 (i.e., phase A) under an SVPWM scheme.
Figure 3:
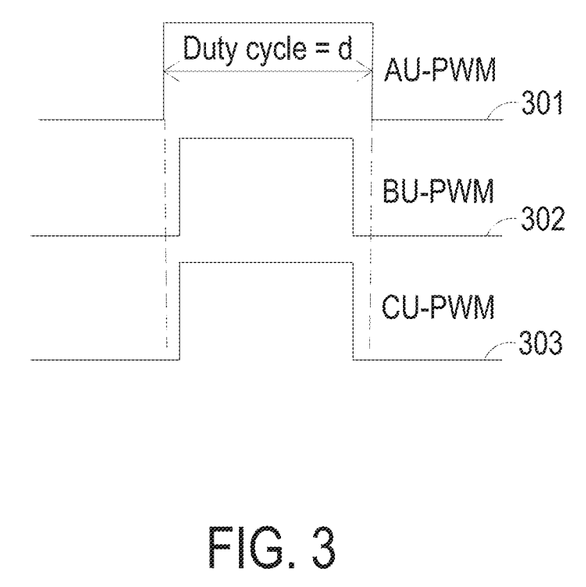
FIG. 3 shows conductive periods ("duty cycles") 301, 302 and 303 of switches 103-1, 103-3 and 103-5, respectively, under an SVPWM scheme.

FIG. 2 illustrates providing a positive output phase current from terminal 104-1 (i.e., phase A) under an SVPWM scheme. Under an SVPWM scheme, the upper and lower switches of each phase are driven by complementary signals. Thus, as shown. in FIG. 2, the IGBT in switch 103-1 is conducting, while the IGBT in switch 103-2 is non-conducting. The diode in switch 103-2 is forward-biased when the IGBT switch 103-2 is non-conducting, such that terminal 104-1 provides phase A's output phase current that flows into electric motor 106. The positive phase current sustain the zero-frequency or near-zero frequency torque in the hill-hold operation. In this example, phase A's output phase current is greater than either phase B's or phase C's output phase current. FIG. 3 shows conductive periods 301, 302 and 303 of switches 103-1 103-3 and 103-5, respectively, under an SVPWM scheme. When expressed as a fraction of the total duration, each conductive period is referred to as a "duty cycle."

As shown in FIG. 3, the duty cycle of phase A (i.e., duty cycle 301) is d, which is greater than the duty cycle of either phase B or phase C (i.e., duty cycle 302 or duty cycle 303). During a hill-hold operation, as illustrated in FIG. 2, the energy loss attributable to the IGBT in a switch (e.g., switch 103-1) is the sum of its conduction and switching losses: $V_{CE\_IGBT} * I_A * d + P_{SW\_IGBT}$, where $V_{CE\_IGBT}$ is the voltage drop across the collector and emitter terminals of the IGBT, $I_A$ is the phase current (e.g., 300 A), d is the duty cycle, and $P_{SW\_IGBT}$ is the switching loss in the IGBT. As shown in FIG. 2, in each phase, when the IGBT of one switch is not conducting (e.g., lower switch 103-2), the positive current is sustained by the diode of that switch. Therefore, the conduction and switching losses in that diode is given by: $V_{f\_diode} * I_A * (1-d) + P_{SW_{diode}}$, where $V_{f\_diode}$ is the voltage drop across the diode of the switch during conduction and $P_{SW_{diode}}$ is its switching loss. In this example, as the phase A switches have a greater duty cycle than either the phase B switches or the phase C switches, the phase A switches (i.e., switches 103-1 and 103-2) have a higher loss, hence a higher thermal stress. Further, within each phase, as the currents through the upper and lower switches are not necessarily the same, unbalanced thermal stresses are also present in the switches within each phase.

Even though DPWM schemes are substantively different from SVPWM schemes, the unbalanced thermal stress concerns in the SVPWM schemes are also present in the DPWM schemes.

SUMMARY

According to one embodiment of the present invention, an apparatus and a method in a multi-phase voltage source inverter balance thermal stresses in the semiconductor switching devices of the multi-phase voltage source inverter. The apparatus includes (a) a monitor configured for monitoring temperatures of the semiconductor switching devices, providing a temperature difference between two of the switching devices; and (b) a controller for providing, based on the temperature difference, a zero-sequence component to be used for adjusting conduction times of each of the semiconductor devices. In one embodiment, the temperature difference corresponds to an upper switch and a lower switch in one of the phases of the multi-phase voltage source inverter, and one of two semiconductor switching devices of the temperature difference has the highest temperature among the semiconductor switching devices. The multi-phase voltage source inverter may be a three-phase voltage source inverter. The conduction times may be adjusted by increasing or decreasing a duty cycle of each of the semiconductor switching devices. Each phase of the multi-phase voltage source inverter may provide an output phase signal that has a zero or near-zero frequency. The output phase signal may include an output phase current whose magnitude is substantially unaffected by the zero-sequence component.

According to one embodiment of the present invention, the method for balancing thermal stresses in semiconductor switching devices may include (a) monitoring temperatures of the semiconductor switching devices to provide a temperature difference between two of the switching devices;

and (b) based on the temperature difference, providing a zero-sequence component to be used for adjusting conduction times of each of the semiconductor devices.

The present invention is better understood upon consideration of the detailed description below in conjunction with the accompanying drawings.

DETAILED DESCRIPTION OF THE PREFERRED EMBODIMENTS

Figure 4:
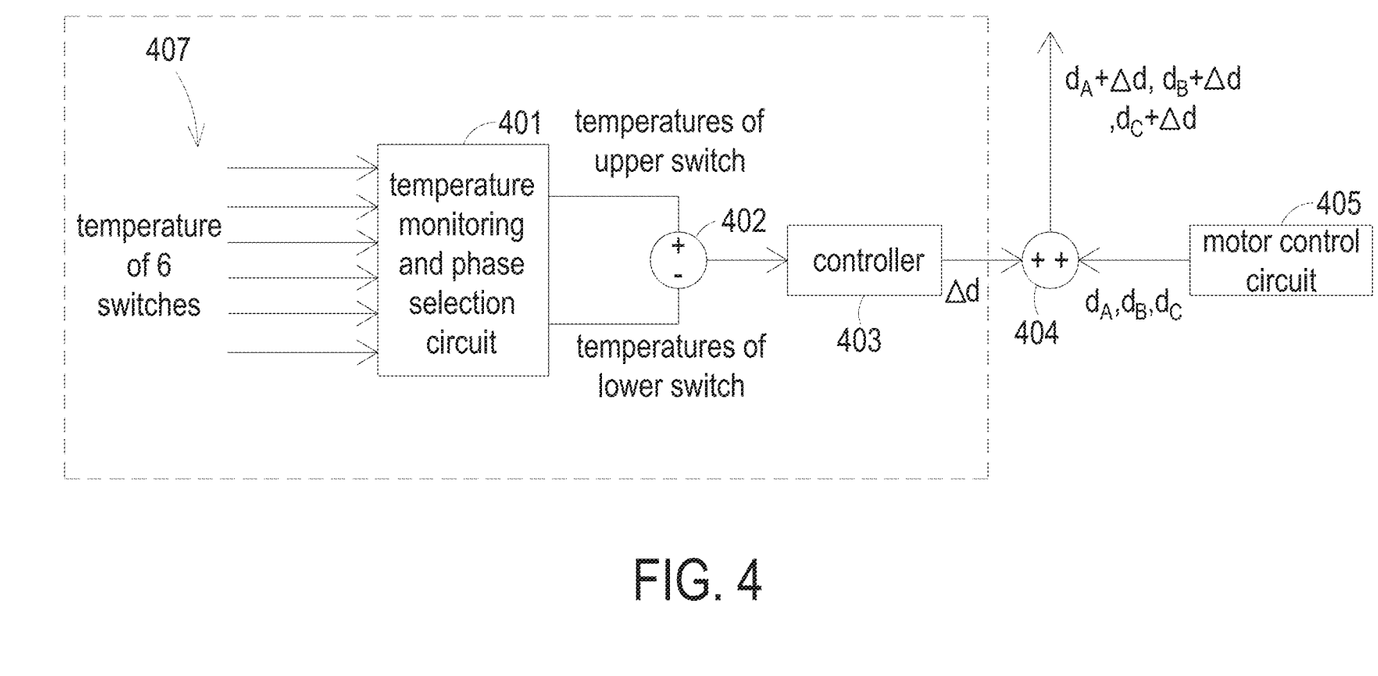
FIG. 4 is a block diagram of control circuit 400 that enables a method that actively balances thermal stresses in the switches of a multi-phase voltage source inverter, based on a temperature difference between the upper and lower switches in the phase that provides the highest phase current, according to one embodiment of the present invention.

According to one embodiment of the present invention, in a multi-phase voltage source inverter operating at a near-zero output frequency, a control circuit implements a method ("the present control scheme") that actively balances thermal stresses in the switches of the multi-phase voltage source inverter, based on a temperature difference between the upper and lower switches in the phase that supplies the highest output phase current. FIG. 4 is a block diagram of control circuit 400 that enables such a method in a three-phase voltage source inverter (e.g., three-phase voltage source inverter 100 of FIG. 1). In the three-phase voltage source inverter, control circuit 400 provides a zero-sequence adjustment to each of the duty cycle signals that drive the switches of the three-phase voltage source inverter. The zero-sequence adjustment is made at adder 404 to each duty cycle signal—i.e., each of duty cycles $d_A$, $d_B$ and $d_C$, for phases A, B and C, respectively. In FIG. 4, the pre-adjusted duty cycle signals are provided, for example, by conventional motor control circuit 405.

As shown in FIG. 4, control circuit 400 receives from temperature sensors temperature signals 407, each indicating a temperature at one of the six switches of the three-phase voltage source inverter. Alternatively, temperature signals 407 may be generated from temperature estimates. Temperature signals 407 are received into temperature monitoring and phase selection circuit 401, which monitors temperature signals 407 and selects therefrom the phase that corresponds to the switch that has the highest temperature. The temperature difference between the upper switch and the lower switch of that phase is provided to controller 403, which may be any suitable proportional (P) or proportional-integral (PI) controller. Controller 403 provides zero-sequence component $\Delta d$ that is added to each of duty cycles $d_A$, $d_B$ and $d_C$, as illustrated in FIG. 5.

Figure 5:
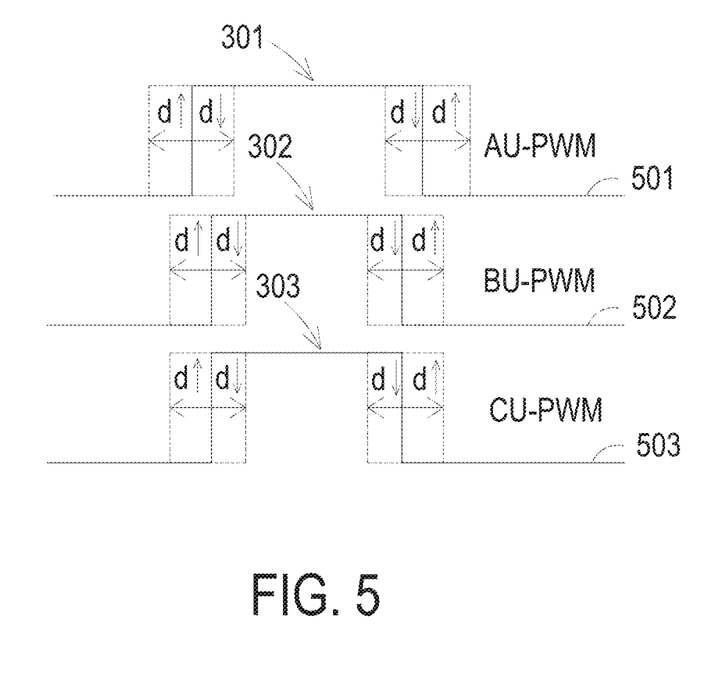
FIG. 5 illustrate adjusting duty cycles $d_A$, $d_B$ and $d_C$ (i.e., duty cycle signals 301, 302 and 303 of FIG. 3) by zero-sequence component $\Delta d$ to provide adjusted duty cycles $d_A+\Delta d$, $d_B+\Delta d$ and $d_C+\Delta d$ in duty cycle signals 501, 502 and 503, respectively.

FIG. 5 illustrate adjusting duty cycles $d_A$, $d_B$ and $d_C$ (i.e., duty cycle signals 301, 302 and 303 of FIG. 3) by zero-sequence component $\Delta d$ to provide adjusted duty cycles $d_A+\Delta d$, $d_B+\Delta d$ and $d_C+\Delta d$ in duty cycle signals 501, 502 and 503, respectively. As shown in FIG. 5, zero-sequence component $\Delta d$ may be positive or negative, corresponding to a resulting increase or decrease of the duty cycle. In this manner, the conduction times of the upper and the lower switches in each phase are adjusted to balance their respective thermal stress. As one of ordinary skill in the art knows, adjusting each phase with a zero-sequence component maintains its output phase current.

Figure 6:
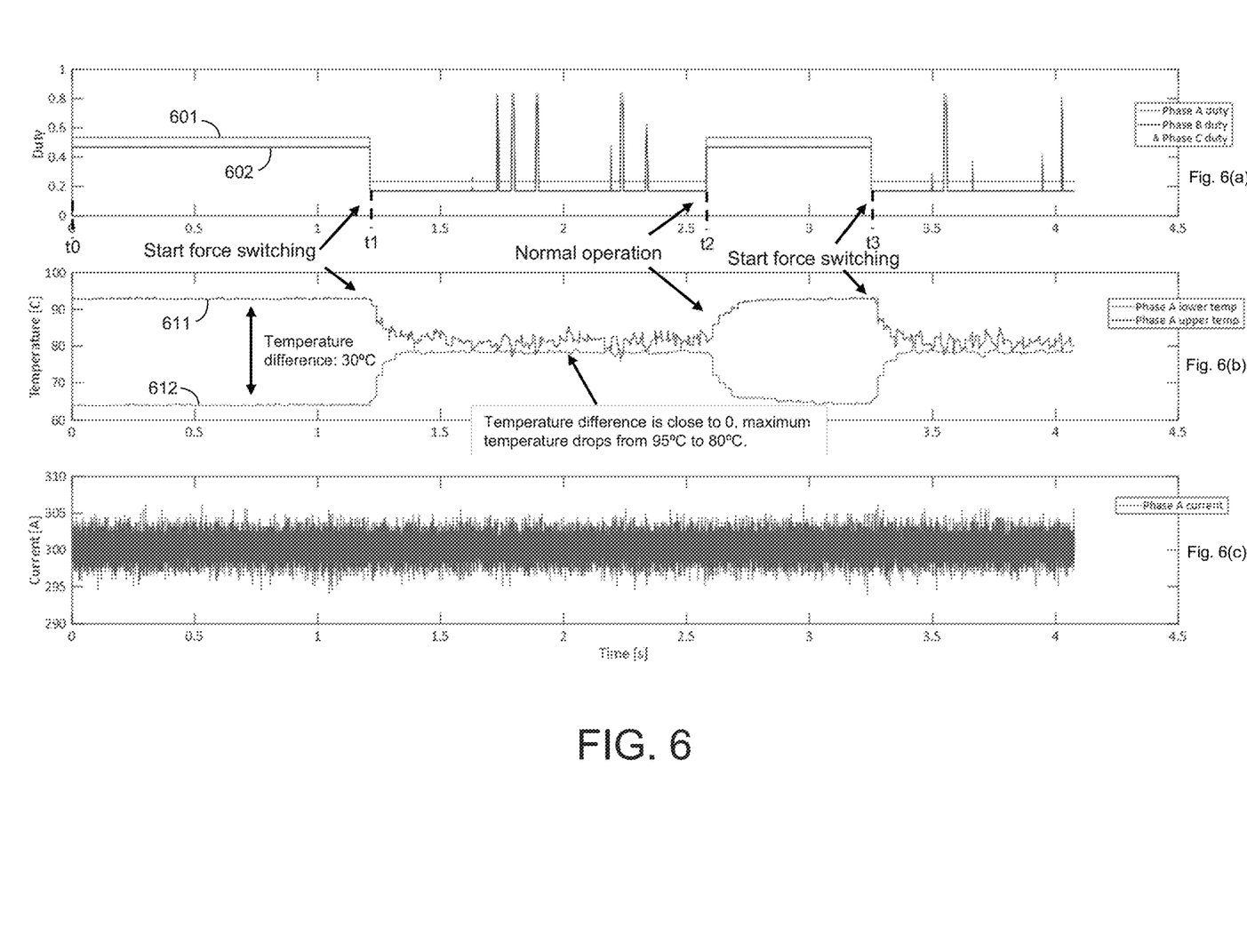
FIGS. 6(a), 6(b) and 6(c) illustrate an electric motor's hill-hold operation in which a 0 Hz torque is enabled by a three-phase voltage source inverter, according to one embodiment of the present invention.

FIGS. 6(a), 6(b) and 6(c) illustrate an electric motor's hill-hold operation in which a 0 Hz torque is enabled by a three-phase voltage source inverter, according to one embodiment of the present invention. FIG. 6(a) shows the duty cycles of the upper switches of phases A, B and C in a three-phase voltage source inverter; waveform 601 represents the duty cycle of the upper switch in phase A and waveform 602 represents both the duty cycles of the upper switches in phases B and C. FIG. 6(b) shows temperatures 611 and 612 of the upper and the lower switches, respectively, over the same time period. FIG. 6(c) shows phase A output current, also over the same time period.

As shown in FIGS. 6(a), 6(b) and 6(c), initially, at time to, phase A has a 0.55 duty cycle, with a peak phase A output current of 300 A, and phases B and C each have a 0.45 duty cycle. Because of its duty cycle and because phase A's output phase current is positive, more current flows through the upper switch's IGBT, causing greater thermal stress to the phase A upper switch, relative to other switches in the three-phase voltage source inverter. Thus, FIG. 6(b) shows that temperature 611 (i.e., the temperature of phase A's upper switch) is 30° C. higher than temperature 612 (i.e., the temperature of phase A's lower switch). Then, at time $t_1$, approximately 1.2 seconds from time to, the present control scheme decreases the duty cycles of the upper switches in all three phases by an equal amount. With a lesser current through the IGBT of phase A's upper switch, the temperatures between phase A's upper switch and phase A's lower switch converge. At time $t_2$, the present control scheme is disabled, such that the temperature difference between phase A's upper and lower switches widens, becoming 30° C. again over time. The present control scheme becomes active again at time $t_3$. During the timer period that the present control scheme is enabled (i.e., between times $t_1$ and $t_2$), phase A's output phase current does not change, as expected and desired.

Figure 7:
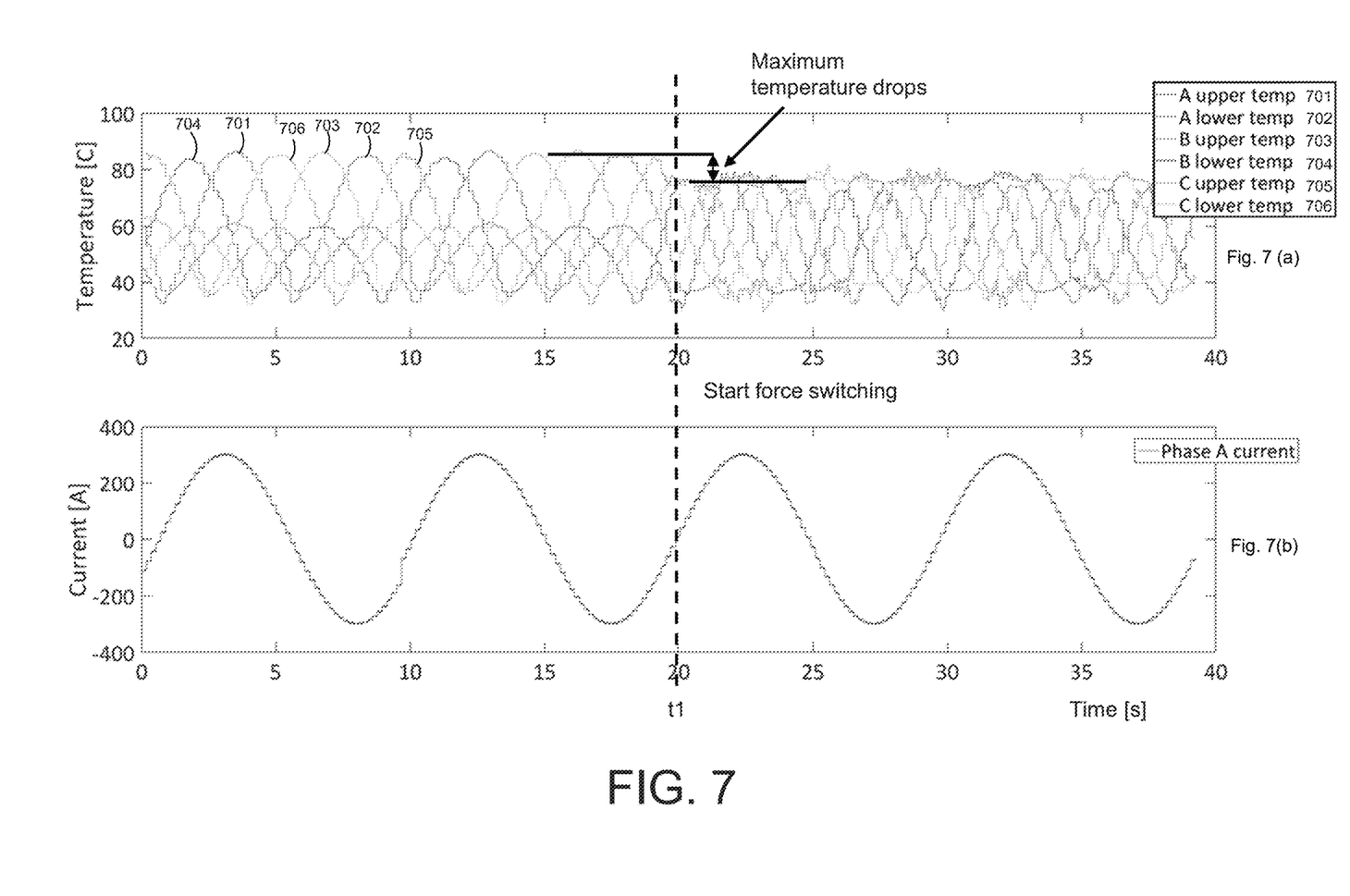
FIGS. 7(a) and 7(b) illustrate a hold-hill operation at an output frequency of 0.1 Hz, enabled by a three-phase voltage source inverter, according to one embodiment of the present invention.

FIGS. 7(a) and 7(b) illustrate a hold-hill operation at an output frequency of 0.1 Hz, enabled by a three-phase voltage source inverter, according to one embodiment of the present invention. In this example, as shown in FIG. 7(b), phase A's peak output phase current is also at 300 A, just as in the example of FIGS. 6(a), 6(b) and 6(c). Because the output phase current has a period of 10 seconds, which is longer than the thermal time constant of the power module, FIG. 7(a) shows that the temperatures of all six switches of the three-phase voltage source inverter reach their respective peak values in regular succession. For each phase, as the temperature of the upper switch reaches its peak, the temperature of the lower switch reaches its peak value, which is about 30° C. lower than the temperature of its corresponding upper switch. As shown in FIG. 7(a), at time $t_1$, the present control scheme is enabled, resulting in a narrowing of the difference in peak temperatures between the upper and the lower switches. The stresses on the upper and the lower switches thus become more balanced. As shown in FIG. 7(b), during the active period of the present control scheme, phase A's output phase current does not change.

As compared to conventional SVPWM and DPWM schemes, the present control scheme actively balances the thermal stresses among the upper and lower devices of the different phases. The resulting reduced device thermal stress extends the lifetimes of the switches in a multi-phase voltage source inverter. The present control scheme provides an increase output torque in hill-hold operations.

The above detailed description is provided to illustrate specific embodiments of the present invention and is not intended to be limiting. Numerous modifications and variations within the scope of the present invention are possible. The present invention is set forth in the accompanying claims.

We claim:

1. In a multi-phase voltage source inverter, an apparatus for balancing thermal stresses in semiconductor switching devices, comprising:
    a monitor for monitoring temperatures of the semiconductor switching devices, the monitor selecting one of the phases and providing a temperature difference between two of the switching devices in the selected phase, the selected phase being associated with the highest temperature among the semiconductor devices monitored; and
    a controller providing, based on the temperature difference, a zero-sequence component to be used for adjusting conduction times of each of the semiconductor devices.

2. The apparatus of claim 1, wherein the temperature difference corresponds to an upper switch and a lower switch in the selected phase.

3. The apparatus of claim 1, wherein one of two semiconductor switching devices of the temperature difference has the highest temperature among the semiconductor switching devices monitored.

4. The apparatus of claim 1, wherein the multi-phase voltage source inverter comprises a three-phase voltage source inverter.

5. The apparatus of claim 1, wherein the conduction times are adjusted by increasing or decreasing a duty cycle of each of the semiconductor switching devices.

6. The apparatus of claim 1, wherein each phase of the multi-phase voltage source inverter provides an output phase signal that has a zero or near-zero frequency.

7. The apparatus of claim 6, wherein the output phase signal comprises an output phase current whose magnitude is substantially unaffected by the zero-sequence component.

8. In a multi-phase voltage source inverter, a method for balancing thermal stresses in semiconductor switching devices, comprising:
    monitoring temperatures of the semiconductor switching devices to select one of the phases, so as to provide a temperature difference between two of the switching devices in the selected phase, the selected phase being associated with the highest temperature among the semiconductor devices monitored; and
    based on the temperature difference, providing a zero-sequence component to be used for adjusting conduction times of each of the semiconductor devices.

9. The method of claim 8, wherein the temperature difference corresponds to an upper switch and a lower switch in the selected phase.

10. The method of claim 8, wherein one of two semiconductor switching devices of the temperature difference has the highest temperature among the semiconductor switching devices monitored.

11. The method of claim 8, wherein the multi-phase voltage source inverter comprises a three-phase voltage source inverter.

12. The method of claim 8, wherein the conduction times are adjusted by increasing or decreasing a duty cycle of each of the semiconductor switching devices.

13. The method of claim 8, wherein each phase of the multi-phase voltage source inverter provides an output phase signal that has a zero or near-zero frequency.

14. The method of claim 13, wherein the output phase signal comprises an output phase current whose magnitude is substantially unaffected by the zero-sequence component.

* * * * *